Patented Oct. 21, 1941

2,259,479

UNITED STATES PATENT OFFICE 2,259,479

PROCESS FOR THE MANUFACTURE OF THE SOLID COMPOUND OF HYDROGEN PEROXIDE AND UREA

William E. Morgan, Ridgefield, N. J., assignor to Sales Affiliates, Inc., New York, N. Y., a corporation of New York No Drawing. Application August 3, 1938, Serial No. 222,786

23 Claims. (Cl. 260—555)

My invention relates to the art or process of preparing the well known, solid chemical compound of hydrogen peroxide and urea, and, particularly, to a new method or procedure for such preparation.

Substantially four distinct methods have been hitherto available for preparing said compound. The usual practice operates upon a moderately concentrated aqueous solution of the components, either by chilling said solution to such temperatures, below ordinary room temperatures, as correspond to extensive crystallization of the compound, continuing by filtration in order to effect separation from the greater part of the solvent water, and further by drying; or by evaporating a considerable amount of excess water from said solution, preferably under pressures less than ordinary atmospheric pressures, and at temperatures not exceeding ordinary atmospheric temperatures, continuing by completion of drying. According to a third method, more recently proposed, the compound is to be formed under given conditions through the absorption by urea, as solid, of hydrogen peroxide, as vapor, from a current of other gases or vapors. According to a fourth method, likewise more recently proposed, the preparation of the solid compound is to be accomplished in two steps; the first, an interaction between solid urea and a restricted quantity of highly concentrated, aqueous hydrogen peroxide, in such a uniform manner, attainable through fine subdivision of the reacting substances, that a moist mixture is not even temporarily produced, and yielding a solid intermediate product, which contains, after drying, about one-half the finally requisite peroxide content; and the second, an interaction between said intermediate product and a restricted quantity of highly concentrated aqueous hydrogen peroxide, following the treatment and conditions of the first step, and yielding a final product, which contains after drying almost the full peroxide content of the solid compound.

In order to render the solid compound sufficiently stable for undergoing without extensive decomposition all subsequent handling and necessary storage, the distributed presence of small amounts of stabilizing substances must be secured in the product, and such stabilization has been hitherto accomplished by including said stabilizers first with one or both of the reacting substances before their interaction, or, second, with their aqueous intermixture before separation from excess solvent water, or by incorporating said stabilizers with the solid compound after separating said compound from the greater part of the excess solvent water, or by some combination of two or more of these stabilizing procedures. As stabilizing substances citric acid, salicylic acid, tannic acid, succinic acid, phenacetine, methyl phthalate, benzoylecgonine, boric acid, sodium hydrogen sulfate, sodium hydrogen phosphates, acid phosphates, pyrophosphates, metaphosphates, starch, amylose, dextrine, glycogen, acetanilide, hippuric acid, phenylglycerine ether, orthomethoxylphenylglycerine ether, benzyl oxethylether, sugars, pyrophosphoric acid, water glass, protalbic acid, gum arabic, sodium chloride and tin chloride have been recommended.

Common characteristics of the hitherto described methods, are, first, the absence of any deliberate, purposive employment of temperatures substantially above ordinary atmospheric temperatures; and, second, the requirement of appreciable periods of treatment for the combined formation, isolation, and stablization of the solid compound of hydrogen peroxide and urea. Each of said methods involves, consequently, one or more of several serious disadvantages. Some methods entail prolonging the interaction of the components, or the continuation of their intermixing in the presence of water, while large quantities of diluent materials, such as solvent water, or inert gases or vapors are being handled or removed; such methods tend to subject the already formed product, or the original components, or both, to losses by decomposition. One method entails a plurality of separate steps and necessarily involves, in addition to said losses by decomposition, an uneconomic repetition of handling and preemption of apparatus. Another method entails a supplementary treatment of the mother liquor from the separated solid compound, for the recovery of a considerable quantity of said compound carried by the solvent water, in order to avoid waste. This same method entails further a separate treatment of the solid compound for completion of its stabilization. Some methods entail difficulty in properly controlling physical and chemical conditions throughout a considerable mass of material, so that the final stabilized product may not be uniform. Unless allowance for losses is generous, up to 10 per cent or more molecular excess of hydrogen peroxide in some of the reaction systems of these methods, the losses lead to yields of product, or to peroxide strengths of product, which fall considerably short of theoretical values.

The existence of one or more of these various disadvantages in the hitherto known processes for preparing the solid compound of hydrogen peroxide and urea has been reflected in a high cost of product in relation to the costs for the raw materials. Such conditions have in turn obstructed wide use of this long-known, extremely convenient and concentrated form of hydrogen peroxide.

Notwithstanding all previous experience of the more or less rapid decomposition, at temperatures substantially above ordinary atmospheric temperatures, of hydrogen peroxide solutions and of hydrogen peroxide compounds, and notwithstanding all previous teaching in technical literature on the subject, I have found that the preparation of the solid compound of hydrogen peroxide and urea can be accomplished easily and conveniently, with a substantially quantitative yield of material, excellent both in strength and stability, in a single step of short duration, followed only by immediately subsequent crystallization and completion of drying of the solid compound, when the reaction is caused to occur at temperatures substantially above ordinary atmospheric temperatures, in a substantially liquid reaction-mixture comprising urea and highly concentrated aqueous hydrogen peroxide, of which the water content is so restricted as to suffice only for immediate and substantially complete liquefaction after intermixing for the purpose of rapidly securing homogeneity by agitation.

I have found that my process of preparation can be rendered more perfect by the inclusion, prior to crystallization, in said liquid reaction-mixture, at temperatures substantially above ordinary atmospheric temperatures, of small quantities of certain stabilizing substances, hereinafter specified.

I have furthermore found that said stabilizing substances may be chosen for properties such that their employment in said liquid reaction-mixture at temperatures substantially above ordinary atmospheric temperatures favors their subsequent rapid crystallization, together with that of the solid hydrogen peroxide-urea compound at temperatures appreciably above ordinary atmospheric temperatures whereby they become distributed in a satisfactorily uniform manner throughout the mass of solid compound, and therefore become serviceable, without a special step for their incorporation therewith, for adequate stabilization of the solid compound during and after drying and during storage at ordinary atmospheric temperatures.

I have found that, in carrying out the preparation of said solid compound at temperatures considerably higher than ordinary atmospheric temperatures, the observance of certain precautions for avoidance of appreciable decomposition renders my process more perfect. These precautions are, first, the previously mentioned inclusion of stabilizing substances; second, the limitation of the highest temperatures reached in the reaction-mixture through adjustment and control of the temperatures of the separate components before intermixing, and through selection of the concentrations of the reacting substances employed; third, the limitation of the period of substantially complete fluidity of the mixture of the components so that said period shall be not longer than that required for rapid, yet thorough mixing and reaction; and, fourth, the initiation of rapid cooling and crystallization, immediately after the period of mixing and reaction, for example, by pouring the hot fluid onto a cool surface, or by suitably spraying the hot liquid into dry air.

I have found that the cooled solid product which is rapidly formed after the last step in the process hereinbefore described is moist with a low water content, and further requires only completion of drying at ordinary atmospheric temperatures in order to prepare it for grinding and compression into tablets, or for other treatment, for the trade.

I have found that the aforesaid adjustment of maximum temperatures below such temperatures as are unnecessarily and harmfully elevated either locally or generally in the reaction-mixture, and the aforesaid limitation of the period of substantially complete liquefaction at the temperature selected for the thorough mixing and reaction of the components, hydrogen peroxide and urea, can both be insured by previous separate heating of one or both components to specifiable temperatures substantially above ordinary atmospheric temperatures. I have found that the process of dissolution or liquefaction of the solid component, urea, which is endothermic or absorptive of heat, can be substantially promoted by the heat developed during the chemical interaction between the components, which is exothermic or liberative of heat. I have found that these processes of opposite tendency can be adjusted to the concentrations of the components in the resulting aqueous intermixture, and to the specifiable temperatures of separate, previous heating of one or both components, so effectively that the total heat available in the system after intermixing shall be more than sufficient for immediate, substantially complete liquefaction, at the temperature selected, whereby the supply of additional heat from an external source, and, a corresponding undesired extension of the effective period of intermixing and reaction of the components at such temperatures, are rendered unnecessary.

More particularly, my invention comprehends the employment at temperatures substantially above ordinary atmospheric temperatures, of all those aqueous mixtures of hydrogen peroxide and urea which contain less than 36 per cent water, equivalent closely to less than 3 moles of water for each mole of hydrogen peroxide or urea, and which comprise substantially equimolecular mixtures of hydrogen peroxide and urea, including not more than 8 per cent molecular excess of either component, and which are further characterized by the requirement of temperatures not lower than 37 degrees C. for equilibrium between the fluid mixture and minimal quantities of the solid phase. The systems or mixtures hereby defined comprise not less than 38.5 per cent urea, not less than 21.3 per cent hydrogen peroxide, not more than 36 per cent water, and correspond closely to the dissolution of the urea at the selected temperatures in not less than 37 per cent aqueous hydrogen peroxide.

Of these aqueous mixtures of hydrogen peroxide and urea hereinbefore defined I have found some examples more advantageous than others for preparing the solid compound of hydrogen peroxide and urea, according to the influence of various considerations hereinafter discussed upon the choice of optimum values for concentrations and temperatures.

I have found particularly efficient those examples in which the said mixture comprises, roughly, 31-32 per cent hydrogen peroxide, 53.5-55 per cent urea, 12.5-13 per cent water. Such mixtures correspond substantially to the dissolution of a slightly less than equimolecular quantity of dry, solid urea in approximately 70 per cent hydrogen peroxide and usually exhibit crystals at temperatures close to 70 degrees C.

If mixtures are employed which contain appreciably less than 12.5 per cent water, corresponding, for example, to the dissolution of a slightly less than equimolecular quantity of urea in 80 per cent hydrogen peroxide, I have found that the full advantage of my process is not gained. This effect is due, firstly, to the higher temperatures to which one or both of the separate components must be previously heated in order to insure substantially complete liquefaction immediately subsequent to the completed intermixing; and, secondly, to the higher temperatures which are required for maintaining the mixture in a condition of substantially complete liquefaction until ready for crystallization. The economy and regulation of the process, as well as the strength and stability of the product, tend to be adversely affected by these factors. It is true that the lower water-content of the crystallized product, which corresponds to a water-content lower than 12.5 per cent of the reaction-mixture, favors rapid and nearly complete crystallization upon cooling, and facilitates completion of drying, and other operations upon the product, but these advantages are offset by the adverse influence of the other factors cited.

If, on the other hand, mixtures are employed which contain appreciably more than 13 per cent water, corresponding, for example to the dissolution of a slightly less than equimolecular quantity of urea in, say, 40 per cent hydrogen peroxide, I have found that maximum efficiency of my invention is not obtained because of the increased quantity of water in the mixture. Subsequent crystallization is less rapid and less complete for a given degree of cooling, the consistency of the cooled crystalline mass has a tendency to be mushy or paste-like, due to the larger accumulations of fluid accompaniment, the material is consequently less amenable to handling, and to subsequent drying operations, which thereby are rendered more complicated, as well as more prolonged. The comparative ease of preparing hydrogen peroxide solutions containing appreciably less than 70 per cent hydrogen peroxide constitutes the chief advantage gained from their use. Employment of such solutions does not appreciably improve the economy and regulation of the process, nor the yield, strength and stability of the product, through the effect of such factors as the lower temperatures required for separate heating of one or both components previous to intermixing, and the lower temperatures required for maintaining the completed intermixture in a state of substantially complete liquefaction until ready for crystallization, and the lower temperatures during the progress of crystallization.

My invention further comprehends the stabilization of the reaction-mixtures comprehended in my invention, at temperatures substantially above ordinary atmospheric temperatures and at any time prior to crystallization of the solid compound, by addition to one or both of the components before mixing, or to the completed intermixture of the components, of an amount of certain stabilizing substances not exceeding 3 per cent by weight of the solid product obtained after crystallization and drying, which stabilizing substances are defined, chemically, as substances adequately resistant to oxidation and capable of generating in aqueous media a mild acidity and, physically, as substances solid and less than moderately soluble in aqueous media at ordinary temperatures. I recommend orthophthalic acid, orthophthalic anhydride, benzoic acid, but without limiting myself to these examples of such substances. The inclusion of such stabilizers in the reaction-mixtures comprehended in my invention is not in all cases necessary for stabilization of said mixtures at temperatures substantially above ordinary atmospheric temperatures, but the regulation of the physical and chemical conditions favoring stability within said mixtures is always rendered more perfect through the presence therein of such stabilizers. I recommend therefore their employment. The operative convenience of my process is well served by the inclusion of such stabilizers with one or both of the reacting substances before intermixing.

My invention further comprehends the stabilization of the crystallized and dried solid compound of hydrogen peroxide and urea by the incorporation therewith of the stabilizers hereinbefore defined and recommended for the reaction-mixtures comprehended in my invention, through the inclusion of said stabilizers in said reaction-mixtures at any time prior to crystallization of the solid compound, and through crystallization of said stabilizers together with crystallization of the solid compound at temperatures substantially above ordinary atmospheric temperatures. I point out particularly the absence in the previous numerous and various recommendations of the prior art for the stabilization of the compound of hydrogen peroxide and urea, either as solid or dissolved in aqueous media, of a comprehensive formulation of the essential requirements for such stabilizers as are adapted equally for the stabilization of highly concentrated aqueous solutions of the said compound, or its components, or both, at temperatures substantially above ordinary, atmospheric temperatures, and for stabilization of the solid compound at ordinary atmospheric temperatures, and for the distributed incorporation of said stabilizers with said solid compound, independently of a separate or supplementary treatment of said compound or of one or both of its components for such incorporation. More particularly, I point out the novelty and usefulness of my selection of stabilizers for that combination of chemical and physical properties, which is adapted simultaneously to chemical stabilization of the reaction-mixtures comprehended in my invention at temperatures substantially above ordinary atmospheric temperatures and of the solid compound at ordinary atmospheric temperatures, and to proper distribution of said stabilizers, without appreciable segregation, throughout the solid product by the physical reaction of rapid crystallization inherent in my process of preparation of said solid compound.

My invention further comprehends the limitation of the somewhat variable highest temperatures reached in the reaction-mixtures comprehended in my invention, and further, the limitation of the period of intermixture of the components, hydrogen peroxide and urea, in said reaction-mixtures at temperatures substantially above ordinary atmospheric temperatures, through a procedure for securing substantially complete liquefaction of said reaction-mixtures immediately after the completion of intermixture, and consisting of the separate heating, previously to intermixing, of one or both components to temperatures specifiable for the operation of intermixing, and substantially higher than ordinary atmospheric temperatures. Such limitations are desirable, in view of the well known losses by decomposition in solutions and compounds of hydrogen peroxide during extended periods at elevated temperatures. The requirement of substantially complete liquefaction in the reaction-mixtures comprehended in my invention immediately after the completion of intermixture is equally desirable, in order to accelerate and facilitate thorough mixing and distribution of the components, hydrogen peroxide and urea, and of the stabilizers, prior to crystallization of the solid compound. The gradual accomplishment of substantially complete liquefaction after intermixing, for example, through supply of heat to the reaction-mixture from an external source, constitutes less advantageous procedure, since such procedure prolongs the period of intermixture at temperatures substantially above ordinary atmospheric temperatures, and involves local, temporary overheating above necessary temperatures. Through the procedure which consists of separate heating of one or both components, hydrogen peroxide and urea, previously to intermixing, and of the reciprocal adjustment of their separate temperatures at the time of intermixing, the requirement of immediate and substantially complete liquefaction in the resulting reaction-mixture at temperatures substantially higher than ordinary atmospheric temperatures, and corresponding to the relatively high crystallization temperatures of the reaction-mixtures comprehended in my invention, is reconciled with the requirement for limitation of maximum temperatures and of the period of intermixture of the components at said temperatures of substantially complete liquefaction. Said reciprocal adjustment of temperatures embodies the principle hereinbefore explained of balancing the physical heat demands of the process against the chemical heat supply thereof, and rendering immediately available in the separate components the additional heat required for the proper operation of the process. Said reciprocal adjustment of temperatures depends upon the concentrations of the reacting substances selected or available for the process, and upon the procedure adopted, but said temperatures are readily specificable from data quickly obtainable in one or more trial experiments for any given combination of said concentrations and procedure.

For purpose of exemplification therefore but without limiting the scope of my invention thereto, I describe a process of producing the solid compound of hydrogen peroxide and urea according to my method by examples, wherein parts signify parts by weight, as follows:

*Example 1*

128 parts of urea are warmed with 4 parts of added ortho-phthalic acid to 95 degrees C. To the warm mixture at 95 degrees C. are added 105.5 parts of 71.1 per cent aqueous hydrogen peroxide, containing 75 parts of hydrogen peroxide, equivalent to 1.04 times the theoretical requirement, at a temperature of 108.5 degrees C., attained in previous separate warming. There results immediately, upon adequate agitation and intermixing a clear, substantially fluid reaction-mixture at a maximum temperature of 75 degrees C., which is poured in a fluid condition at 68.5 degrees C. after 3 minutes onto a cool surface for crystallization. Crystallization is immediate, and is completed in large part while the material is still warm. The solid material is moist with about 12.8 per cent water, which is rapidly removable at ordinary atmospheric pressures and at temperatures not exceeding 41 degrees C. by a current of dry air. The air dried product amounts to 202.5 parts, containing 34.9 per cent hydrogen peroxide, and 1.25 per cent free phthalic acid. The yield of dried solid product amounts therefore to 99.3 per cent of the theoretical yield based upon the combined parts of urea and stabilizer, and the hydrogen peroxide yield amounts to 97.8 per cent of the theoretical yield based upon the combined parts of urea and stabilizer, and to 94.2 per cent of the hydrogen peroxide employed. The stability of the solid product is very good, corresponding to a mean loss of 0.0075 gram hydrogen peroxide per gram per hour at 76.2 degrees C., which is closely the stability of good, commercial grades of the product.

*Example 2*

128 parts of urea are warmed with 29 parts of added water to complete fluidity at a maximum temperature of 94 degrees C., the mixture is cooled to 85 degrees C., and to the mixture 4 parts of ortho-phthalic acid are added. Further cooling immediately occurs, and crystallization of urea begins. To the mixture of acid, water, dissolved urea, and urea crystals at 80.5 degrees C. are added 77 parts of 98.1 per cent aqueous hydrogen peroxide, containing 75.5 parts of hydrogen peroxide, equivalent to 1.05 times the theoretical requirement, at a temperature of 20 degrees C. There results immediately after intermixing and agitation a clear, substantially fluid reaction-mixture at a maximum temperature of 81 degrees C., which is poured in a fluid condition at 72.5 degrees C. after 3 minutes onto a cool surface for crystallization. Crystallization is immediate, and is completed in large part while the material is still warm. The solid material is moist with about 12.8 per cent water, which is rapidly removable under ordinary atmospheric pressures and at temperatures not exceeding 41 degrees C. by a current of dry air. The air dried product amounts to 202.4 parts, containing 35.1 per cent hydrogen peroxide, and 1.06 per cent free phthalic acid. The yield of dried solid product amounts therefore to 99.2 per cent of the theoretical yield based upon the combined parts of urea and stabilizer, and the hydrogen peroxide yield amounts to 98.1 per cent of the theoretical yield based upon the combined parts of urea and stabilizer, and to 93.9 per cent of the hydrogen peroxide employed. The stability of the solid product is very good, corresponding to a mean loss of .0075 gram hydrogen peroxide per gram per hour at 76.2 degrees C., which is closely the stability of good commercial grades of the product.

It is possible further within the limits of my invention to vary somewhat the proportions of the different ingredients; the temperatures employed; the periods during which the materials are subjected to these temperatures; the concentrations selected, as hereinbefore described; the nature, amount and time of addition of the substance or substances included for stabilization; the temperature and agency employed for cooling the molten material; also the time, temperature and agency employed for drying the product; and other factors, according to such considerations as the quality of the raw materials, and the desired characters of the product. For instance, atomization of the hot fluid mixture of the components into turbulent, warm, dry air may be employed, since cooling, crystallization and partial drying would occur simultaneously, and the resultant finely divided product would be immediately adapted to further treatment, such as completion of drying, and/or compression into tablets.

I claim:

1. A process for the manufacture of the solid chemical compound of hydrogen peroxide and urea, which includes compounding a highly concentrated, aqueous mixture with not more than 36 per cent water, and substantially equimolecular proportions of hydrogen peroxide and urea, effecting substantially complete liquefaction directly after intermixing the components, and at temperatures substantially higher than 37° C. and lower than temperatures involving harmfully extensive decomposition, and thereupon cooling to effect crystallization throughout substantially the entire mass of said mixture.

2. A process for the manufacture of the solid chemical compound of hydrogen peroxide and urea, which includes compounding a highly concentrated aqueous mixture with not more than 36 per cent water, not less than 38.5 per cent urea, not less than 21.3 per cent hydrogen peroxide, effecting a substantially complete liquefaction directly after intermixing of the components, and at temperatures not lower than 37 degrees C. or higher than temperatures involving harmfully extensive decomposition, and thereupon cooling to effect crystallization throughout substantially the entire mass of said mixture.

3. A process for the manufacture of the solid chemical compound of hydrogen peroxide and urea, which includes compounding a highly concentrated aqueous mixture with not more than 36 per cent water, and substantially equimolecular proportions of hydrogen peroxide and urea, effecting substantially complete liquefaction directly after intermixing of the components, and at temperatures substantially higher than 37° C. and lower than temperatures involving harmfully extensive decomposition, and stabilizing said mixture by incorporation therewith, at some time prior to crystallization of the solid compound, of stabilizing substances which are resistant to oxidation, mildly acidic, and of less than moderate independent solubility in aqueous media at ordinary temperatures, in amounts not exceeding 3 per cent of the solid product thereafter obtained, and thereupon causing crystallization throughout substantially the entire mass of said mixture by cooling.

4. A process for the manufacture of the solid chemical compound of hydrogen peroxide and urea, which includes compounding a highly concentrated aqueous mixture with not more than 36 per cent water, and substantially equimolecular proportions of hydrogen peroxide and urea, effecting substantially complete liquefaction directly after intermixing of the components, and at temperatures substantially higher than 37° C. and lower than temperatures involving harmfully extensive decomposition, and stabilizing said mixture by incorporation with at least one of the components, and prior to their intermixing, of substances, which are resistant to oxidation, mildly acidic and of less than moderate independent solubility in aqueous media at ordinary temperatures, in amounts not exceeding 3 per cent of the solid product thereafter obtained, and thereupon causing crystallization throughout substantially the entire mass of said mixture by cooling.

5. A process for the manufacture of the solid chemical compound of hydrogen peroxide and urea, which includes compounding a highly concentrated aqueous mixture with not more than 36 per cent water, not less than 38.5 per cent urea, not less than 21.3 per cent hydrogen peroxide, effecting substantially complete liquefaction directly after intermixing of the components, and at temperatures not lower than 37 degrees C. or higher than temperatures involving harmfully extensive decomposition, and stabilizing said mixture by incorporation therewith, at some prior time to crystallization of the solid compound, of substances which are resistant to oxidation, mildly acidic, and of less than moderate independent solubility in aqueous media at ordinary atmospheric temperatures, in amounts not exceeding 3 per cent of the solid product thereafter obtained, and thereupon causing crystallization throughout substantially the entire mass of said mixture by cooling.

6. A process for the manufacture of the solid chemical compound of hydrogen peroxide and urea, which includes compounding a highly concentrated aqueous mixture with not more than 36 per cent water, not less than 38.5 per cent urea, not less than 21.3 per cent hydrogen peroxide, effecting substantially complete liquefaction directly after intermixing of the components, and at temperatures not lower than 37 degrees C. or higher than temperatures involving harmfully extensive decomposition, and stabilizing said mixture by incorporation with at least one of the components, and prior to their intermixing, of substances which are resistant to oxidation, mildly acidic, and of less than moderate independent solubility in aqueous media at ordinary atmospheric temperatures, in amounts not exceeding 3 per cent of the solid product thereafter obtained, and thereupon causing crystallization throughout substantially the entire mass of said mixture by cooling.

7. A process for the manufacture of the solid chemical compound of hydrogen peroxide and urea, which includes compounding a highly concentrated aqueous mixture with not more than 36 per cent water, and substantially equimolecular proportions of hydrogen peroxide and urea, effecting substantially complete liquefaction directly after intermixing of the components, and at temperatures substantially higher than 37° C. and lower than temperatures involving harmfully extensive decomposition, and providing for ultimate stabilization of the solid compound by incorporation with said mixture, at some time prior to crystallization of said solid compound, of solid stabilizing substances which are resistant to oxidation, mildly acidic, and of less than moderate independent solubility in aqueous media at ordinary atmospheric temperatures, in amounts not exceeding 3 per cent of the solid product thereafter obtained, and thereupon causing crystallization throughout substantially the entire mass of said mixture by cooling.

8. A process for the manufacture of the solid chemical compound of hydrogen peroxide and urea, which includes compounding a highly concentrated aqueous mixture with not more than 36 per cent water, not less than 38.5 per cent urea, not less than 21.3 per cent hydrogen peroxide, effecting substantially complete liquefaction directly after intermixing of the components, and at temperatures not lower than 37 degrees C. or higher than temperatures involving harmfully extensive decomposition, and providing for ultimate stabilization of the solid compound by incorporation with said mixture, at some time prior to crystallization of said solid compound, of solid stabilizing substances which are resistant to oxidation, mildly acidic, and of less than moderate independent solubility in aqueous media at ordinary atmospheric temperatures, in amounts not exceeding 3 per cent of the solid product thereafter obtained, and thereupon causing crystallization through substantially the entire mass of said mixture by cooling.

9. A process for the manufacture of the solid chemical compound of hydrogen peroxide and urea, which includes compounding a highly concentrated, aqueous mixture with not more than 36 per cent water, and substantially equimolecular proportions of hydrogen peroxide and urea, and securing substantially complete liquefaction immediately after intermixing of the components and at temperatures substantially higher than 37° C. and lower than temperatures involving harmfully extensive decomposition through heat partly derived from a separate warming of at least one of the components, prior to their intermixing, to temperatures substantially higher than ordinary atmospheric temperatures, and thereupon causing crystallization throughout substantially the entire mass of said mixture by cooling.

10. The process for the manufacture of the solid chemical compound of hydrogen peroxide and urea, which includes compounding a highly concentrated aqueous mixutre of hydrogen peroxide and urea wherein water content is limited to not substantially more than 36%, effecting a substantially complete liquefaction directly after intermixing of the components, and at temperatures substantially higher than 37° C. and lower than temperatures involving harmfully extensive decomposition, and thereupon cooling to effect crystallization throughout substantially the entire mass of said mixture.

11. The process for the manufacture of the solid chemical compound of hydrogen peroxide and urea, which includes compounding a highly concentrated aqueous mixture of hydrogen peroxide and urea wherein water content is limited to not substantially more than 36%, effecting a liquefaction directly after intermixing of the components, and at temperatures not lower than 37 degrees C. or higher than temperatures involving harmfully extensive decomposition, and thereupon effecting crystallization throughout substantially the entire mass of said mixture.

12. The process for the manufacture of the solid chemical compound of hydrogen peroxide and urea, which includes compounding a highly concentrated aqueous mixture of hydrogen peroxide and urea wherein water content is limited to not substantially more than 36%, effecting an intermixing and liquefaction at temperatures substantially higher than 37° C. and lower than temperatures involving harmfully extensive decomposition, and thereupon effecting a solidification of the compound of the two components.

13. The process for the manufacture of the solid chemical compound of hydrogen peroxide and urea, which includes compounding a highly concentrated aqueous mixture of hydrogen peroxide and urea wherein water content is limited to not substantially more than 36%, and effecting an intermixing and liquefaction at temperatures substantially higher than 37° C. and lower than temperatures involving harmfully extensive decomposition.

14. The process for the manufacture of the solid chemical compound of hydrogen peroxide and urea, which includes compounding a highly concentrated aqueous mixture of hydrogen peroxide and urea wherein water content is limited to not substantially more than 36%, effecting an intermixing and liquefaction of said components at temperatures substantially higher than 37° C. and lower than temperatures involving harmfully extensive decomposition and stabilizing said mixture by incorporation therewith, at some time prior to crystallization of the solid compound, of stabilizing substances which are resistant to oxidation, mildly acidic, and of less than moderate independent solubility in aqueous media at ordinary temperatures.

15. The process for the manufacture of the solid chemical compound of hydrogen peroxide and urea, which includes compounding a highly concentrated aqueous mixture of hydrogen peroxide and urea wherein water content is limited to not substantially more than 36%, effecting a liquefaction at temperatures substantially higher than 37° C. and lower than temperatures involving harmfully extensive decomposition and stabilizing said mixture by incorporation of orthophthalic acid therewith, at some time prior to crystallization of the solid compound.

16. A process for the manufacture of the solid chemical compound of hydrogen peroxide and urea, which includes compounding a highly concentrated aqueous mixture with not more than 36 per cent water, not less than 38.5 per cent urea, not less than 21.3 per cent hydrogen peroxide, and securing substantially complete liquefaction immediately after intermixing of the components and at temperatures not lower than 37 degrees C. or higher than temperatures involving harmfully extensive decomposition through heat partly derived from a separate warming of at least one of the components, prior to their intermixing, to temperatures substantially higher than ordinary atmospheric temperatures, and thereupon causing crystallization throughout substantially the entire mass of said mixture by cooling.

17. A process for the manufacture of the solid chemical compound of hydrogen peroxide and urea, which includes compounding a highly concentrated, aqueous mixture of hydrogen peroxide and urea wherein water content is limited to not substantially more than 36%, effecting substantially complete liquefaction directly after intermixing of the components, and at temperatures substantially higher than 37° C. and lower than temperatures involving harmfully extensive decomposition, and thereupon effecting crystallization throughout substantially the entire mass of the said mixture.

18. A process for the manufacture of the solid chemical compound of hydrogen peroxide and urea, which includes compounding a highly concentrated aqueous mixture with not more than 36 per cent water, and substantially equimolecular proportions of hydrogen peroxide and urea, effecting substantially complete liquefaction directly after intermixing of the components, and at temperatures substantially higher than 37° C. and lower than temperatures involving harmfully extensive decomposition, and stabilizing said mixture by incorporation therewith, at some time prior to crystallization of the solid compound, of orthophthalic acid, in amounts not exceeding 3 per cent of the solid product thereafter obtained, and thereupon causing crystallization throughout substantially the entire mass of said mixture by cooling.

19. A process for the manufacture of the solid chemical compound of hydrogen peroxide and urea, which includes compounding a highly concentrated aqueous mixture with not more than 36 per cent water, and substantially equimolecular proportions of hydrogen peroxide and urea, effecting substantially complete liquefaction directly after intermixing of the components, and at temperatures substantially higher than 37° C. and lower than temperatures involving harmfully extensive decomposition, and stabilizing said mixture, and simultaneously providing for ultimate stabilization of the solid compound, by incorporation with at least one of the components, and prior to their intermixing, of orthophthalic acid in amounts not exceeding 3 per cent of the solid product thereafter obtained, and thereupon causing crystallization throughout substantially the entire mass of said mixture by cooling.

20. The process for the manufacture of the solid chemical compound of hydrogen peroxide and urea, which includes compounding an aqueous mixture of hydrogen peroxide and urea wherein the water content is not materially greater than 36%, the solution being of such high concentration that complete liquefaction subsists therein only at temperatures substantially higher than 37° C. and lower than temperatures involving harmfully extensive decomposition.

21. The process for the manufacture of the solid chemical compound of hydrogen peroxide and urea, which includes compounding an aqueous mixture of substantially equimolecular quantities of hydrogen peroxide and urea wherein the water content is not materially greater than 36%, the solution being of such high concentration that subsequently to complete liquefaction crystallization begins at temperatures substantially higher than 37° C. and lower than temperatures involving harmfully extensive decomposition.

22. The process for the manufacture of the solid chemical compound of hydrogen peroxide and urea, which includes compounding an aqueous mixture of hydrogen peroxide and urea wherein the water content is not materially greater than 36%, the solution being of such high concentration that after intermixing of the components complete liquefaction is possible only at temperatures substantially higher than 37° C. and lower than temperatures involving harmfully extensive decomposition.

23. The process for the manufacture of the solid chemical compound of hydrogen peroxide and urea, which includes compounding an aqueous mixture of substantially equimolecular quantities of hydrogen peroxide and urea wherein the water content is not materially greater than 36%, the solution being of such high concentration that after complete liquefaction and intermixing of the components crystallization begins at temperatures substantially higher than 37° C. and lower than temperatures involving harmfully extensive decomposition.

WILLIAM E. MORGAN.